US005397276A

United States Patent [19]

Chang

[11] Patent Number: 5,397,276

[45] Date of Patent: Mar. 14, 1995

[54] PULSE ENCODER RESOLUTION ADJUSTMENT APPARATUS

[75] Inventor: Bobby Chang, Thousand Oaks, Calif.

[73] Assignee: R. R. Donnelley & Sons Company, Lisle, Ill.

[21] Appl. No.: 123,345

[22] Filed: Sep. 17, 1993

[51] Int. Cl.$^6$ .................. F16H 7/00; B41J 3/00

[52] U.S. Cl. .................. 474/148; 347/5; 400/103

[58] Field of Search .................. 474/148, 101, 102, 109; 347/5, 9-11; 400/103-107

[56] References Cited

U.S. PATENT DOCUMENTS

| | | | |
|---|---|---|---|
| 3,837,291 | 9/1974 | Umlor | 474/148 X |
| 3,892,174 | 7/1975 | Marcher | 400/106 X |
| 4,538,156 | 8/1985 | Durkee et al. | 347/5 X |
| 4,854,147 | 8/1989 | Buckwitz et al. | 72/7 |
| 4,960,336 | 10/1990 | Brooks et al. | 400/103 X |
| 5,117,610 | 6/1992 | Hartman et al. | 53/411 |
| 5,121,139 | 6/1992 | Burke | 346/138 |
| 5,184,902 | 2/1993 | Harada et al. | 400/185 |
| 5,225,757 | 7/1993 | Burke | 318/696 |
| 5,262,804 | 11/1993 | Petigrew et al. | 400/103 X |

*Primary Examiner*—Michael Powell Buiz
*Attorney, Agent, or Firm*—Marshall, O'Toole, Gerstein, Murray & Borun

[57] ABSTRACT

An adjustment apparatus is disclosed which adjusts the resolution of a pulse encoder. The adjustment apparatus includes at least first and second pulley sets having different pulley ratios and having substantially equal belt perimeters. A pulley belt has a belt circumference substantially equal to the belt perimeters. The pulley belt is transferable from one pulley set to the other so as to adjust the resolution of the pulse encoder.

29 Claims, 3 Drawing Sheets

PULSE ENCODER RESOLUTION ADJUSTMENT APPARATUS

FIELD OF THE INVENTION

The present invention relates to an apparatus for adjusting the resolution of a pulse encoder and, more particularly, to a pulley apparatus for adjusting the number of pulses supplied by a pulse encoder during one unit of movement of an input.

BACKGROUND OF THE INVENTION

A typical pulse encoder has a mechanical input, and is arranged to provide output pulses having a pulse rate which is dependent upon the rate of rotation of the mechanical input. Such a pulse encoder may be used in any of a wide variety of applications. For example, in a process which includes a conveyor, the mechanical input of the pulse encoder can be coupled to the conveyor so that the pulse rate of the output pulses provided by the pulse encoder is a function of the movement of the conveyor. One or more devices of the process are supplied with the output pulses of the pulse encoder in order to synchronize such devices to the movement of the conveyor.

One such component, for example, may be an ink jet printer which prints information on the articles being transported by the conveyor of the process. Where such articles are mail, the ink jet printer may be arranged to print addresses and other information on the mail being transported by the conveyor. In order to insure that the ink jet printer discharges its ink at the time that an envelope or other article of mail is in a position to properly receive the ink, the ink jet printer must be synchronized to the conveyor.

This synchronization is often provided by a pulse encoder. The mechanical input of the pulse encoder is coupled to the conveyor so that the pulse rate of its output pulses is representative of the speed of the conveyor. Thus, as the speed of the conveyor increases, the pulse rate of the output pulses provided by the pulse encoder increases, and as the speed of the conveyor decreases, the pulse rate of the output pulses provided by the pulse encoder decreases. The ink jet printer is connected to the pulse encoder so that the ink jet printer receives the output pulses of the pulse encoder and, thereby, is operated in synchronism with the mail being transported by the conveyor.

An ink jet printer of such an arrangement requires a predetermined number of pulses per inch of conveyor travel so that the ink jet printer is properly synchronized to the conveyor. Moreover, different ink jet printers require different predetermined numbers of pulses per inch of conveyor travel. Even the same printer may require different predetermined numbers of pulses per inch of conveyor travel if, for example, different fonts are to be printed. As a result, if a process includes a first ink jet printer, which operates at a first pulse rate, and if the first ink jet printer is replaced by a second ink jet printer, which operates at a second pulse rate, the resolution of the pulse encoder, i.e. the number of output pulses provided by the pulse encoder per inch of conveyor travel, must be adjusted to accommodate the second ink jet printer; or, if a printer of a process is to be operated at a new number of pulses per inch so as, for example, to permit the printer print a different font, the resolution of the pulse encoder must be adjusted to accommodate the new number of pulses per inch. An adjustment apparatus, therefore, is needed so that the resolution of the pulse encoderscan be made easily and rapidly in order to avoid prolonged disruptions in the operation of the process.

Furthermore, some processes include plural devices, such as ink jet printers, each of which must be synchronized to a conveyor of the process. If each device requires a different number of pulses per inch of conveyor travel for proper synchronization to the conveyor, and if the number pulses provided to each device per inch of travel of the conveyor of the process requires adjustment, an adjustment apparatus must be provided which accommodates the plural devices and which is arranged so that the number pulses provided to each device per inch of travel of the conveyor can be independently, easily, and rapidly adjusted.

SUMMARY OF THE INVENTION

The present invention is directed to an adjustment apparatus which permits the resolution of a pulse supplying means, such as a pulse encoder, to be easily and rapidly adjusted. That is, the adjustment apparatus of the present invention permits the number of pulses, which are provided by a pulse encoder, per unit of movement of an input to be easily and rapidly adjusted. Furthermore, the adjustment apparatus of the present invention may be arranged so that the resolution of a first pulse encoder and the resolution of a second pulse encoder may be easily, rapidly, and independently adjusted.

Therefore, in accordance with one aspect of the present invention, an apparatus for supplying pulses comprises first and second shafts, a pulse supplying means for supplying pulses having a pulse rate, first and second pulley sets, and a pulley belt. The first shaft is coupled to an input. The second shaft is coupled to the pulse supplying means so that the pulse rate of the pulses is a function of the second shaft. The first pulley set is coupled to the first and second shafts and has a first pulley ratio. The second pulley set is coupled to the first and second shafts and has a second pulley ratio. The first and second pulley ratios are different. The pulley belt is transferable between the first and second pulley sets so as to adjust a resolution of the pulse supplying means.

According to another aspect to the invention, an apparatus comprises first and second shafts, a pulse encoder, first and second pulley sets, and a single pulley belt. The first shaft is coupled to a drive input. The second shaft is coupled to the pulse encoder. The first pulley set has a first pulley ratio, has a first pulley coupled to the first shaft, and a second pulley coupled to the second shaft. The second pulley set has a second pulley ratio, a first pulley coupled to the first shaft, and a second pulley coupled to the second shaft. The first and second pulley ratios are different, and the first and second pulley sets have substantially equal belt perimeters. The single pulley belt has a belt circumference substantially equal to the belt perimeters. The single pulley belt is arranged to transfer motion from the first pulley to the second pulley of the first pulley set or from the first pulley to the second pulley of the second pulley set.

According to yet another aspect of the invention, an apparatus comprises a pulse supplying means having a resolution, a drive shaft, and a motion transferring means. The pulse supplying means supplies pulses. The motion transferring means transfers motion of the drive shaft to the pulse supplying means and adjusts the resolution of the pulse supplying means.

BRIEF DESCRIPTION OF THE DRAWING

These and other features and advantages will become more apparent from a detailed consideration of the invention when taken in conjunction with the drawing in which.

DETAILED DESCRIPTION OF THE PREFERRED EMBODIMENTS

Figure 1:
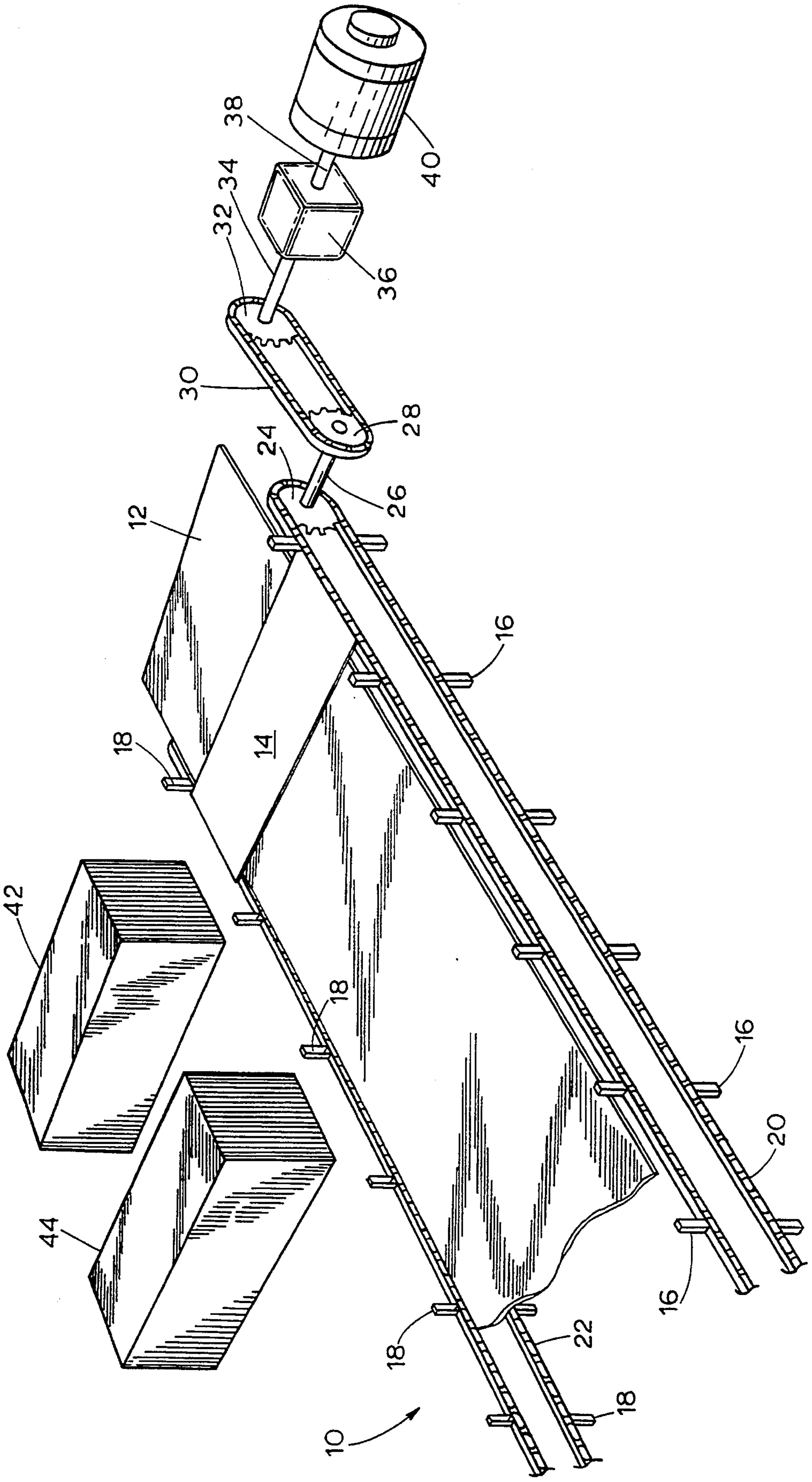
FIG. 1 schematically illustrates a mail table and a drive mechanism therefor as an example of an application of the adjustment apparatus according to the present invention.

FIG. 1 illustrates, as an example, a process in which the adjustment apparatus of the present invention may be used. As shown in FIG. 1, a mail table 10 includes a stationary support surface 12 on which articles, such as an article of mail 14, are transported. The article of mail 14 is transported, i.e. conveyed, along the stationary support surface 12 by a first plurality of lugs 16 on one side of the stationary support surface 12 and a corresponding second plurality of lugs 18 on a second side of the stationary support surface 12. The lugs 16 are attached to a conveyor chain 20, and the lugs 18 are attached to a conveyor chain 22.

The conveyor chain 20 meshes with a toothed sprocket 24, and the conveyor chain 22 meshes with a corresponding toothed sprocket (not shown). The toothed sprocket 24 which meshes with the conveyor chain 20 and the toothed sprocket (not shown) which meshes with the conveyor chain 22 are attached to a drive shaft 26 which, for example, extends underneath the stationary support surface 12. Accordingly, as the drive shaft 26 rotates, the toothed sprockets attached thereto rotate to drive the conveyor chains 20 and 22 in a known fashion. As the conveyor chains 20 and 22 are driven by the toothed sprockets meshed therewith, the lugs 16 and 18 move along the stationary support surface 12 so that the article of mail 14 is conveyed along the stationary support surface 12.

The drive shaft 26 is attached to another toothed sprocket 28 which meshes with a chain 30. A toothed sprocket 32 also meshes with the chain 30 and is attached to an output shaft 34 of a gear box 36. The gear box 36 has an input shaft 38 driven by a motor 40. Accordingly, the motor 40 drives the input shaft 38 of the gear box 36. A gear set within the gear box 36 transfers the motion of the input shaft 38 through a desired gear ratio to the output shaft 34 of the gear box 36. This gear ratio determines the relative rate of rotation between the input shaft 38 and the output shaft 34 of the gear box 36. Rotation of the output shaft 34 of the gear box 36 rotates the toothed sprocket 32. Rotation of the toothed sprocket 32 drives the chain 30 to rotate the toothed sprocket 28. Rotation of the toothed sprocket 28 rotates the drive shaft 26 in order to rotate the toothed sprockets (including the toothed sprocket 24) which mesh with the conveyor chains 20 and 22. Consequently, the conveyor chains 20 and 22 move their associated lugs 16 and 18 along the stationary support surface 12.

Devices which are to operate in conjunction with the mail table 10 may be suitably supported in proximity to the stationary support surface 12. As shown in FIG. 1, these devices may include ink jet printers 42 and 44. The ink jet printers 42 and 44 may be any suitable commercially available ink jet printers, and may have internal controllers which may be arranged to control the ink jet printers 42 and 44 to print addresses and other information on the article of mail 14 as the article of mail 14 is conveyed by the conveyor lugs 16 and 18 along the stationary support surface 12. Instead of internal controllers, the ink jet printers 42 and 44 may alternatively have external controllers.

Figure 2:
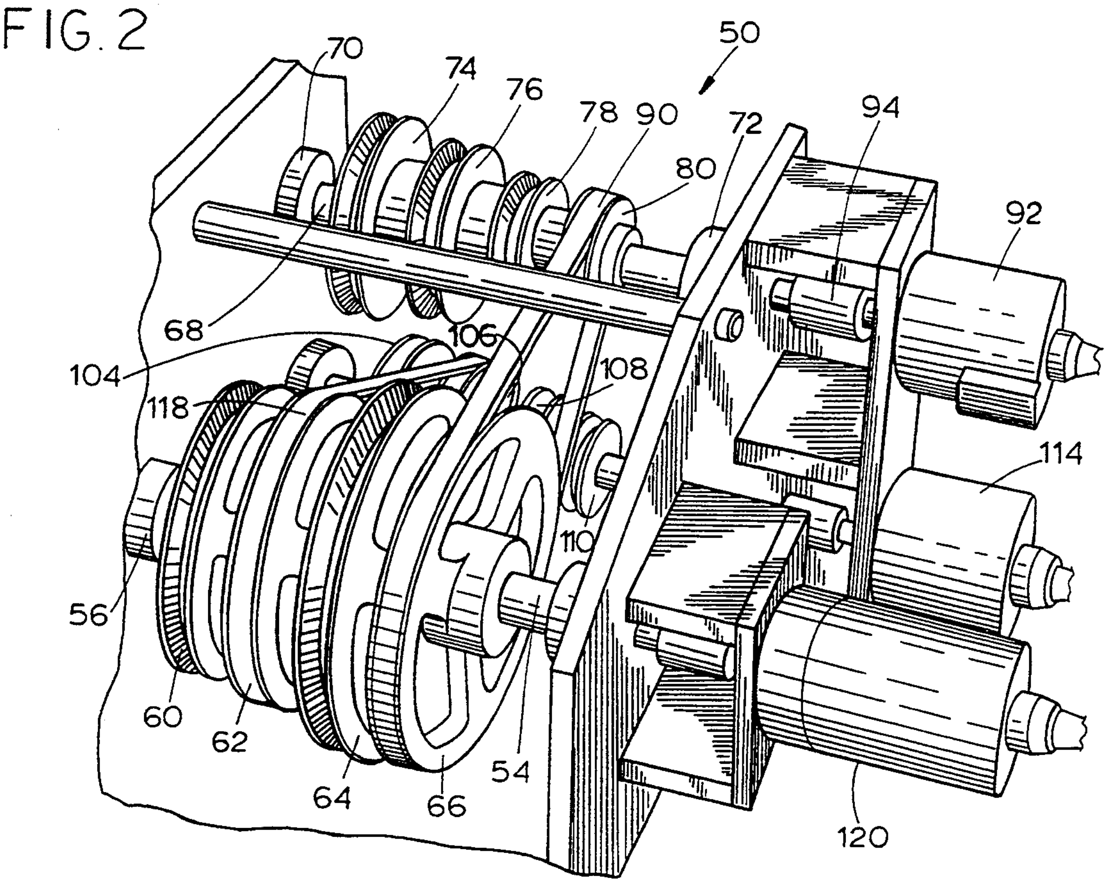
FIG. 2 shows a perspective view of an adjustment apparatus according to the present invention.
Figure 3:
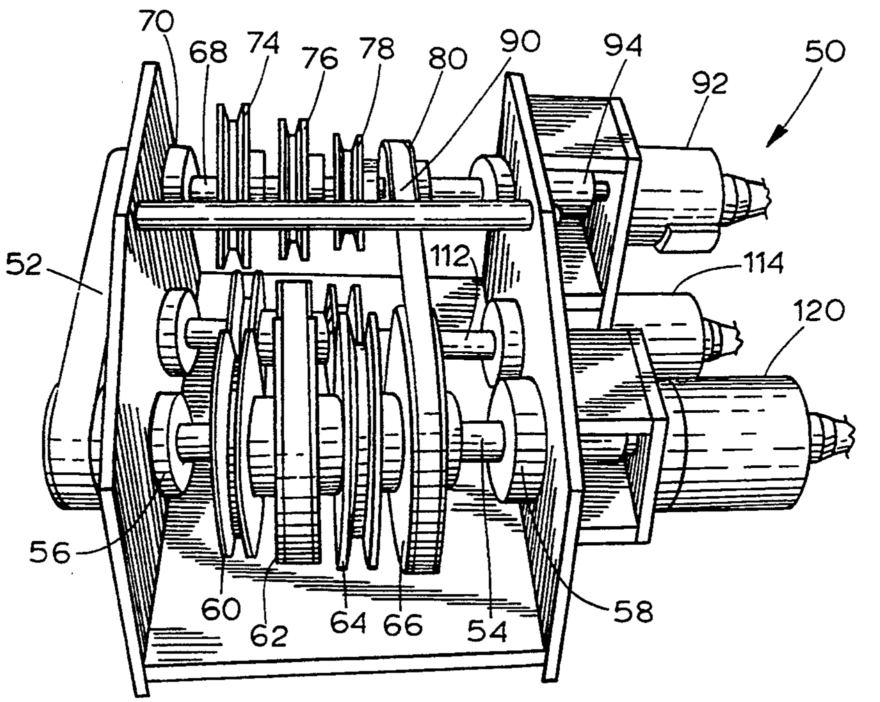
FIG. 3 shows a front view of the adjustment apparatus shown in FIG. 2.
Figure 4:
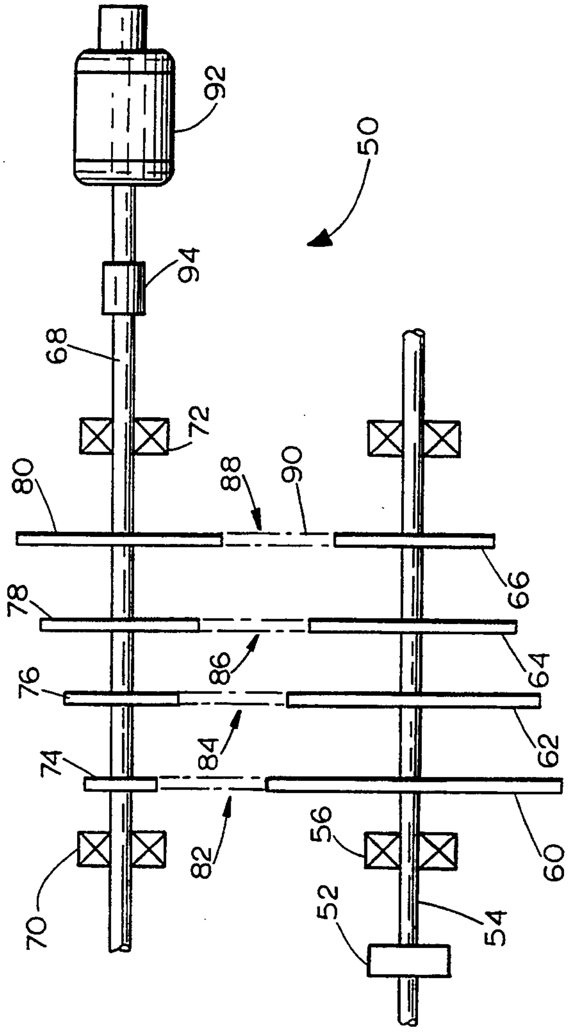
FIG. 4 schematically illustrates the pulley sets of the adjustment apparatus shown in FIGS. 2 and 3; and, FIG. 5 is a mechanical and electrical schematic diagram of a system incorporating the adjustment apparatus of the present invention.

An adjustment apparatus 50 according to the present invention is shown in FIGS. 2–4. This adjustment apparatus 50 includes an input belt 52 which, if the adjustment apparatus 50 is used in conjunction with the mail table 10 shown in FIG. 1, is drivingly coupled to the drive shaft 26 which drives the conveyor chains 20 and 22 for moving the conveyor lugs 16 and 18 along the stationary support surface 12. The input belt 52 is also drivingly coupled to a first shaft 54 of the adjustment apparatus 50.

The first shaft 54 of the adjustment apparatus 50 is rotatably supported by a pair of bearings 56 and 58. Because the drive shaft 26 is coupled to the first shaft 54 of the adjustment apparatus 50 by the input belt 52, the first shaft 54 of the adjustment apparatus 50 rotates in synchronism with the movement of the conveyor chains 20 and 22. Pulleys 60, 62, 64, and 66 are attached to the first shaft 54 of the adjustment apparatus 50 so that the pulleys 60, 62, 64, and 66 rotate with rotation of the first shaft 54.

The adjustment apparatus 50 includes a second shaft 68 which is supported for rotation by a pair of bearings 70 and 72. Pulleys 74, 76, 78, and 80 are attached to the second shaft 68 of the adjustment apparatus 50 so that the pulleys 74, 76, 78, and 80 rotate with rotation of the second shaft 68.

As best shown in FIG. 4, the pulleys 60 and 74 form a first pulley set 82 of the adjustment apparatus 50, the pulleys 62 and 76 form a second pulley set 84 of the adjustment apparatus 50, the pulleys 64 and 78 form a third pulley set 86 of the adjustment apparatus 50, and the pulleys 66 and 80 form a fourth pulley set 88 of the adjustment apparatus 50. A pulley belt 90 (best shown in FIGS. 2 and 3) drivingly couples together the corresponding pulleys of a selected pulley set. For example, as shown in FIGS. 2 and 3, the pulley belt 90 drivingly couples together the pulleys 66 and 80. Accordingly, movement of the input belt 52 causes rotation of the first shaft 54. The pulley 66 rotates with the first shaft 54. Because the pulley belt 90 drivingly couples the pulley 80 with the pulley 66, the pulley 80 rotates upon rotation of the pulley 66.

Each pulley set has a different pulley ratio. Accordingly, the pulley ratio of the pulleys 60 and 74 of the first pulley set 82 causes the first pulley set 82 to rotate the second shaft 68 at a first rate with respect to the speed of rotation of the first shaft 54 of the adjustment apparatus 50. The pulley ratio of the pulleys 62 and 76 of the second pulley set 84 causes the second pulley set 84 to rotate the second shaft 68 at a second rate with respect to the same speed of rotation of the first shaft 54 of the adjustment apparatus 50. The pulley ratio of the pulleys 64 and 76 of the third pulley set 86 causes the third pulley set 86 to rotate the second shaft 68 at a third rate with respect to the same speed of rotation of the first shaft 54 of the adjustment apparatus 50. Finally, the pulley ratio of the pulleys 66 and 80 of the fourth pulley set 88 causes the fourth pulley set 88 to rotate the second shaft 68 at a fourth rate with respect to the same speed of rotation of the first shaft 54 of the adjustment apparatus 50.

A pulse encoder 92 is coupled to the second shaft 68 through a flexible coupling 94. One example of a pulse encoder which can be used for the pulse encoder 92 is a Model No. H25E-F1-SB-600-AC-8830-LED-EM16 pulse encoder supplied by BET Motion Systems Company. The pulse encoder 92 is driven at any one of four rates with respect to the rate of rotation of the first shaft 54 depending upon which pulley set of the adjustment apparatus 50 is coupled by the pulley belt 90°.

The pulley belt 90 must be sufficiently elastic that it can be easily moved from one pulley set to another without detachment of any of the elements of the adjustment apparatus 50 except the pulley belt 90. That is, the pulley belt 90 must be sufficiently elastic that it can be slipped off of one pulley set and slipped over another pulley set while the pulley sets remain in place. At the same time, the pulley belt 90 must have a length so that the pulley belt 90 has sufficient tension that there is little or no slippage between the pulley belt 90 and the pulleys coupled thereby as the coupled pulleys rotate. (While there may be some slight slippage, this slight slippage can be compensated, if desired, by the controllers which respond to the pulses from the pulse encoders, such as the pulse encoder 92.)

The pulley belt 90, in order to meet these requirements, may be fashioned, for example, from size A Eagle belt which generally has a V-shaped cross section and is supplied in continuous lengths. The size A Eagle belt may be cut to size and the ends spliced together to form the pulley belt 90.

The length of the pulley belt 90 must accommodate each of the pulley sets 82, 84, 86, and 88. Therefore, the belt perimeters of the pulley sets 82, 84, 86, and 88 must be substantially equal to one another so that the pulley belt 90 can be easily and rapidly moved from one pulley set to another. The belt perimeter of a pulley set is defined as the path around the pulleys of a pulley set which is circumscribed by the pulley belt 90. Thus, the belt perimeter of the first pulley set 82 is substantially equal to the belt perimeter of the second pulley set 84 which is substantially equal to the belt perimeter of the third pulley set 86 which is substantially equal to the belt perimeter of the fourth pulley set 88.

Accordingly, the diameters of the first pulleys 60, 62, 64, and 66 and of the second pulleys 74, 76, 78, and 80 in the corresponding pulleys sets 82, 84, 86, and 88 are selected not only to provide the desired pulley ratio, but are also selected to yield substantially equal belt perimeters for the pulley sets 82, 84, 86, and 88. The same pulley belt 90 can then be used for each of the pulley sets 82, 84, 86, and 88. The pulley belt 90 has enough elasticity that it can be readily slipped off of a first pulley set and stretched over a second pulley set in order to decouple the pulleys of the first pulley set and to couple the pulleys of the second pulley set.

The pulse encoder 92 is driven by the second shaft 68 of the adjustment apparatus 50 and provides pulses at an output thereof having a pulse rate dependent upon the rate of rotation of the second shaft 68. The pulley ratios of each of the pulley sets 82, 84, 86, and 88 is selected to provide a desired resolution for the pulse encoder 92. That is, the pulse rate of the output pulses supplied by the pulse encoder 92 per unit of rotation of the first shaft 54 may be adjusted by moving the pulley belt 90 from one pulley set to another. Accordingly, the pulse encoder 92 is arranged to provide a desired number of pulses per inch of travel of the conveyor chains 20 and 22 dependent upon which of the pulley sets 82, 84, 86, and 88 is selected, i.e. which pulleys are coupled by the pulley belt 90.

The pulse encoder 92 and the pulley ratios of the pulley sets 82, 84, 86, and 88 may be arranged, for example, to provide 120 pulses per inch of travel of the conveyor chains 20 and 22 if the first pulley set 82 is selected, to provide 105 pulses per inch of travel of the conveyor chains 20 and 22 if the second pulley set 84 is selected, to provide 72 pulses per inch of travel of the conveyor chains 20 and 22 if the third pulley set 86 is selected, and to provide 60 pulses per inch of travel of the conveyor chains 20 and 22 if the fourth pulley set 88 is selected. It should be stressed that these pulse per inch numbers are by way of example only. The actual number of pulses per inch provided by the pulse encoder 92 may vary as desired.

Since the input belt 52 is coupled to the drive shaft 26 instead of to the output of the motor 40 directly, the adjustment apparatus 50 is coupled more closely to the conveyor chains 20 and 22 than to the motor 40. Accordingly, the rotation of the second shaft 68 of the adjustment apparatus 50, and therefore the pulse rate of the output pulses supplied by the pulse encoder 92, are tied more closely to the travel of the conveyor chains 20 and 22 than to the output of the motor 40. Thus, any backlash or other aberrations in the travel of the conveyor chains 20 and 22 not caused by the motor 40 will be more accurately reflected in the pulse rate of the pulses provided by the pulse encoder 92.

Figure 5:
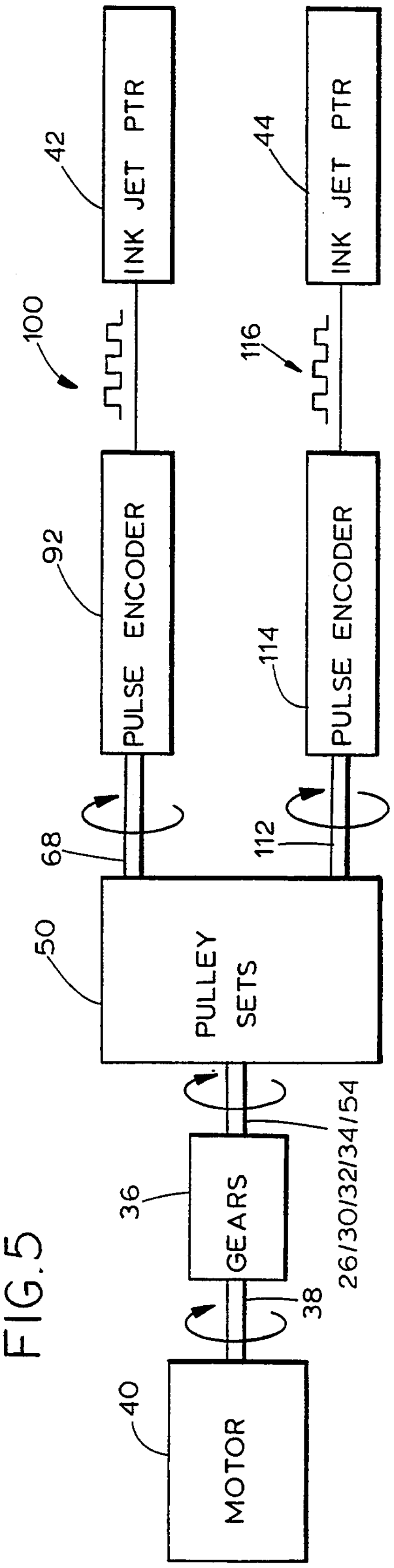

The mechanical and electrical circuit for the present invention is shown in FIG. 5. Accordingly, the motor 40 drives the input shaft 38 of the gear box 36. The gear box 36 drives its output shaft and coupling apparatus 26/30/32/34 in order to, in turn, drive the first shaft 54 of the adjustment apparatus 50. The pulley belt 90 of the adjustment apparatus 50 couples the pulleys of an appropriate pulley set 82, 84, 86, or 88 so that the first shaft 54 of the adjustment apparatus 50 drives the second shaft 68 of the adjustment apparatus 50. The second shaft 68 of the adjustment apparatus 50 drives the pulse encoder 92 which provides a first set of pulses 102 to the ink jet printer 42 shown in FIG. 1. The pulse rate of the first pulse set 102 is dependent upon the rotation rates of the first and second shafts 54 and 68 and the selected pulley set of the adjustment apparatus 50. Accordingly, the pulse per inch rate of the first set of pulses 102 is dependent upon which pulley set is coupled by the pulley belt 90. Thus, the first pulse set 102 may have different pulse per inch rates for each inch of travel of the conveyor chains 20 and 22.

As shown in FIGS. 2, 3, and 5, the adjustment apparatus 50 may be provided with third pulleys 104, 106, 108, and 110 for each of the corresponding pulley sets 82, 84, 86, and 88. Each of these third pulleys are coupled to a third shaft 112 (FIGS. 3 and of the adjustment apparatus 50. This third shaft 112 may be supported by a pair of bearings in a manner similar to which the first and second shafts 54 and 68 are supported. The third shaft 112 is attached to a pulse encoder 114 which supplies a second set pulses 116 to the second ink jet printer 44. A second pulley belt 118 is included within the adjustment apparatus 50 in order to couple a first pulley 60, 62, 64, or 66 to a third pulley 104, 106, 108, or 110 of a selected one of the pulley sets 82, 84, 86, and 88.

Accordingly, if the mail table 10 includes two ink jet printers 42 and 44 each of which requires a different pulse rate for synchronization to the mail table 10, the ink jet printer 42 may be supplied with pulses from the pulse encoder 92 and the ink jet printer 44 may be supplied with pulses from the pulse encoder 114. Furthermore, the resolution of each pulse encoder 92 and 114 may be changed independently, easily, and rapidly by simply moving each pulley belt 90 and 118 from one pulley set to another. If desired, an additional pulse encoder 120 may be driven directly by the first shaft 54 of the adjustment apparatus 50.

Certain modifications of the present invention will be readily apparent to those skilled in the art. For example, it is possible to use the adjustment apparatus of the present invention in connection with devices other than ink jet printers, in connection with conveyors other than mail tables, and in connection with other processes. Accordingly, the present invention is to be limited only by the appended claims.

I claim:

1. An apparatus for supplying pulses comprising:

a first shaft coupled to an input;

pulse supplying means for supplying pulses, wherein the pulses have a pulse rate, and wherein the pulse supplying means has a resolution:

a second shaft coupled to the pulse supplying means so that the pulse rate is a function of the second shaft;

a first pulley set coupled to the first and second shafts, wherein the first pulley set has a first pulley ratio;

a second pulley set coupled to the first and second shafts, wherein the second pulley set has a second pulley ratio, and wherein the first and second pulley ratios are different; and, a pulley belt transferable between the first and second pulley sets so as to adjust the resolution of the pulse supplying means.

2. The apparatus of claim 1 wherein the first pulley set comprises a first pulley attached to the first shaft and a second pulley attached to the second shaft, wherein the second pulley set comprises a first pulley attached to the first shaft and a second pulley attached to the second shaft, and wherein the pulley belt selectively transfers motion from the first pulley to the second pulley of the first pulley set or from the first pulley to the second pulley of the second pulley set.

3. The apparatus of claim 2 wherein the first and second pulley sets have substantially equal belt perimeters, and wherein the pulley belt comprises an elastic pulley belt having a length so that the pulley belt circumscribes a belt perimeter.

4. The apparatus of claim 1 wherein the pulse supplying means comprises first and second pulse supplying means for supplying corresponding first and second sets of pulses, wherein the second shaft comprises a first pulley output shaft coupled to the first pulse supplying means and a second pulley output shaft coupled to the second pulse supplying means, wherein the first pulley set is coupled to the first shaft and to the first and second pulley output shafts, and wherein the second pulley set is coupled to the first shaft and to the first and second pulley output shafts.

5. The apparatus of claim 4 wherein the second pulleys of the first and second pulley sets are attached to the first pulley output shaft, wherein the first pulley set further comprises a third pulley attached to the second pulley output shaft, wherein the second pulley set further comprises a third pulley attached to the second pulley output shaft, wherein the pulley belt comprises first and second pulley belts, wherein the first pulley belt selectively transfers motion from the first pulley to the second pulley of the first pulley set or from the first pulley to the second pulley of the second pulley set, and wherein the third pulley belt transfers motion from the first pulley to the third pulley of the second pulley set or from the first pulley to the third pulley of the second pulley set.

6. The apparatus of claim 5 wherein the first and second pulleys of the first pulley set has a first belt perimeter, wherein the first and third pulleys of the first pulley set has a second belt perimeter, wherein the first and second pulleys of the second pulley set has a third belt perimeter, wherein the first and third pulleys of the second pulley set has a fourth belt perimeter, wherein the first, second, third, and fourth belt perimeters are substantially equal, and wherein the first and second pulley belts comprise corresponding first and second elastic pulley belts each having a length so that the first and second pulley belts are substantially coextensive with the first, second, third, and fourth belt perimeters.

7. The apparatus of claim 6 wherein the first and second pulleys of the first pulley set has a first pulley ratio, wherein the first and third pulleys of the first pulley set has a second pulley ratio, wherein the first and second pulleys of the second pulley set has a third pulley ratio, and wherein the first and third pulleys of the second pulley set has a fourth pulley ratio.

8. The apparatus of claim 1 further comprising a third pulley set coupled to between the first and second shafts, wherein the third pulley set has a third pulley ratio, wherein the first, second, and third pulley ratios are different, wherein the pulley belt is transferable between the first, second, and third sets of pulley so that the second shaft is driven at a first rate by the first pulley set, at a second rate by the second pulley set, and at a third rate by the third pulley set.

9. The apparatus of claim 8 wherein the first pulley set comprises a first pulley attached to the first shaft and a second pulley attached to the second shaft, wherein the second pulley set comprises a first pulley attached to the first shaft and a second pulley attached to the second shaft, wherein the third pulley set comprises a first pulley attached to the first shaft and a second pulley attached to the second shaft, and wherein the pulley belt selectively transfers motion from the first pulley to the second pulley of the first pulley set, from the first pulley to the second pulley of the second pulley set, or from the first pulley to the second pulley of the third pulley set.

10. The apparatus of claim 9 wherein the first, second, and third pulley sets have substantially equal belt perimeters, and wherein the pulley belt comprises an elastic pulley belt having a length so that the pulley is substantially coextensive with the belt perimeters.

11. The apparatus of claim 8 wherein the pulse supplying means comprises first and second pulse supplying means for supplying corresponding first and second sets of pulses, wherein the second shaft comprises a first pulley output shaft coupled to the first pulse supplying means and a second pulley output shaft coupled to the second pulse supplying means, wherein the first pulley set is coupled to the first shaft and to the first and second pulley output shafts, wherein the second pulley set is coupled to the first shaft and to the first and second pulley output shafts, and wherein the third pulley set is coupled to the first shaft and to the first and second pulley output shafts.

12. The apparatus of claim 11 wherein the second pulleys of the first, second and third pulley sets are attached to the first pulley output shaft, wherein the first pulley set further comprises a third pulley attached to the second pulley output shaft, wherein the second pulley set further comprises a third pulley attached to the second pulley output shaft, wherein the third pulley set further comprises a third pulley attached to the second pulley output shaft, wherein the pulley belt selectively transfers motion from the first pulley to the second or third pulleys of the first pulley set, or from the first pulley to the second or third pulleys of the second pulley set, or from the first pulley to the second or third pulleys of the third pulley set.

13. The apparatus of claim 12 wherein the first, second, and third pulley sets have substantially equal belt perimeters, and wherein the pulley belt comprises an elastic pulley belt having a length so that the pulley is substantially coextensive with the belt perimeters.

14. An apparatus comprising:

a first shaft coupled to a drive input;

a pulse encoder:

a second shaft coupled to the pulse encoder;

a first pulley set having a first pulley ratio, the first pulley set having a first pulley coupled to the first shaft and a second pulley coupled to the second shaft;

a second pulley set having a second pulley ratio, the second pulley set having a first pulley coupled to the first shaft and a second pulley coupled to the second shaft, wherein the first and second pulley ratios are different, and wherein the first and second pulley sets have substantially equal belt perimeters; and, a single pulley belt having a length so that the pulley belt is substantially coextensive with the belt perimeters, wherein the pulley belt is arranged to transfer motion from the first pulley to the second pulley of the first pulley set or from the first pulley to the second pulley of the second pulley set.

15. The apparatus of claim 14 wherein the pulse encoder comprises first and second pulse encoders, wherein the second shaft comprises a first pulley output shaft coupled to the first pulse encoder and a second pulley output shaft coupled to the second pulse encoder, wherein the first pulley set is coupled to the first shaft and to the first and second pulley output shafts, and wherein the second pulley set is coupled to the first shaft and to the first and second pulley output shafts.

16. The apparatus of claim 15 wherein the second pulleys of the first and second pulley sets are attached to the first pulley output shaft, wherein the first pulley set further comprises a third pulley attached to the second pulley output shaft, wherein the second pulley set further comprises a third pulley attached to the second pulley output shaft, and wherein the pulley belt selectively transfers motion from the first pulley to the second or third pulleys of the first pulley set or from the first pulley to the second or third pulleys of the second pulley set.

17. The apparatus of claim 16 wherein the first and third pulleys of the first and second pulley sets having substantially equal belt perimeters, wherein the pulley belt comprises first and second pulley belts, and wherein the second pulley belt has a length so that the second pulley belt is substantially coextensive with the belt perimeters of the first and third pulleys of the first and second pulley sets.

18. The apparatus of claim 14 further comprising a third pulley set coupled to the first and second shafts, wherein the third pulley set has a third pulley ratio, wherein the first, second, and third pulley ratios are different, wherein the pulley belt is transferable between the first, second, and third pulley sets so that the second shaft is driven at a first rate by the first pulley set, at a second rate by the second pulley set, and at a third rate by the third pulley set.

19. The apparatus of claim 18 wherein the third pulley set comprises a first pulley attached to the first shaft and a second pulley attached to the second shaft, and wherein the pulley belt selectively transfers motion from the first pulley to the second pulley of the first pulley set, from the first pulley to the second pulley of the second pulley set, or from the first pulley to the second pulley of the third pulley set.

20. The apparatus of claim 19 wherein the first and third pulleys of the first, second, and third pulley sets have substantially equal belt perimeters, wherein the pulley belt comprises first and second pulley belts, and wherein the second pulley belt has a length so that the second pulley belt is substantially coextensive with the belt perimeters of the first and third pulleys of the first, second, and third pulley sets.

21. The apparatus of claim 18 wherein the pulse encoder comprises first and second pulse encoders, wherein the second shaft comprises a first pulley output shaft coupled to the first pulse encoder and a second pulley output shaft coupled to the second pulse encoder, wherein the first pulley set is coupled to the first shaft and to the first and second pulley output shafts, wherein the second pulley set is coupled to the first shaft and to the first and second pulley output shafts, and wherein the third pulley set is coupled to the first shaft and to the first and second pulley output shafts.

22. The apparatus of claim 21 wherein the second pulleys of the first, second, and third pulley sets are attached to the first pulley output shaft, wherein the first pulley set further comprises a third pulley attached to the second pulley output shaft, wherein the second pulley set further comprises a third pulley attached to the second pulley output shaft, wherein the third pulley set further comprises a third pulley attached to the second pulley output shaft, and wherein the pulley belt selectively transfers motion from the first pulley to the second or third pulleys of the first pulley set, or from the first pulley to the second or third pulleys of the second pulley set, or from the first pulley to the second or third pulleys of the third pulley set.

23. The apparatus of claim 22 wherein the first and third pulleys of the first, second, and third pulley sets have substantially equal belt perimeters, wherein the pulley belt comprises first and second pulley belts, and wherein the second pulley belt has a length so that the second pulley belt is substantially coextensive with the belt perimeters of the first and third pulleys of the first, second, and third pulley sets.

24. The apparatus of claim 23 wherein the first and second pulleys of the first pulley set has a first pulley ratio, wherein the first and third pulleys of the first pulley set has a second pulley ratio, wherein the first and second pulleys of the second pulley set has a third pulley ratio, and wherein the first and third pulleys of the second pulley set has a fourth pulley ratio.

25. An apparatus comprising:

pulse supplying means for supplying pulses, the pulse supplying means having a resolution;

a drive shaft; and, motion transferring means for transferring motion of the drive shaft to the pulse supplying means and for adjusting the resolution of the pulse supplying means.

26. The apparatus of claim 25 wherein the motion transferring means comprises first and second pulley sets and a pulley belt, wherein the first and second pulley sets have different pulley ratios and substantially equal belt perimeters, and wherein the pulley belt has a belt circumference substantially equal to the pulley belt perimeter.

27. The apparatus of claim 26 wherein the motion transferring means comprises a third pulley set coupled to the drive shaft and to the pulse supplying means, wherein the third pulley set has a third pulley ratio, wherein the first, second, and third pulley ratios are different, and wherein the pulley belt is transferable between the first, second, and third pulley sets.

28. The apparatus of claim 27 wherein the pulse supplying means comprises first and second pulse supplying means for supplying corresponding first and second sets of pulses, wherein the motion transferring means transfers motion from the drive shaft to the first pulse supplying means, and wherein the motion transferring means transfers motion from the drive shaft to the second pulse supplying means.

29. The apparatus of claim 25 wherein the pulse supplying means comprises first and second pulse supplying means for supplying corresponding first and second sets of pulses, wherein the motion transferring means transfers motion from the drive shaft to the first pulse supplying means, and wherein the motion transferring means transfers motion from the drive shaft to the second pulse supplying means.

* * * * *